(12) United States Patent
Smith et al.

(10) Patent No.: US 7,189,473 B2
(45) Date of Patent: Mar. 13, 2007

(54) BATTERY VENTING SYSTEM

(75) Inventors: Roger Q. Smith, Tai Po (HK); Xiao Ping Liu, Nan Chang (CN)

(73) Assignee: Eastway Fair Company Limited, Tortola (VG)

( * ) Notice: Subject to any disclaimer, the term of this patent is extended or adjusted under 35 U.S.C. 154(b) by 501 days.

(21) Appl. No.: 10/453,836

(22) Filed: Jun. 3, 2003

(65) Prior Publication Data

US 2004/0247996 A1  Dec. 9, 2004

(51) Int. Cl.
*H01M 2/12* (2006.01)

(52) U.S. Cl. .......................... 429/82; 429/87; 429/148

(58) Field of Classification Search ................. 429/82, 429/87, 99, 120, 148, 159
See application file for complete search history.

(56) References Cited

U.S. PATENT DOCUMENTS

| | | |
|---|---|---|
| 1,112,861 A | 10/1914 | Snyder |
| 1,152,247 A | 8/1915 | Walker |
| 1,506,874 A | 9/1924 | Willard |
| 2,413,865 A | 1/1947 | Dalzell |
| 3,178,317 A | 4/1965 | Maddaloni |
| 3,219,485 A | 11/1965 | Foecking et al. |
| 3,352,721 A | 11/1967 | Lecouffe |
| 3,537,907 A | 11/1970 | Wilson |
| 3,734,207 A | 5/1973 | Fishbein |
| 3,745,048 A | 7/1973 | Dinkler et al. |
| 4,091,880 A | 5/1978 | Troutner et al. |
| 4,107,402 A | 8/1978 | Dougherty et al. |
| 4,229,687 A | 10/1980 | Newman |
| 4,313,080 A | 1/1982 | Park |
| 4,443,524 A | 4/1984 | Meinhold et al. |
| 4,522,898 A | 6/1985 | Esrom |
| 4,564,800 A | 1/1986 | Jurjans |
| 4,692,682 A | 9/1987 | Lane et al. |
| 4,735,873 A | 4/1988 | Doundoulakis |
| 4,822,698 A | 4/1989 | Jackovitz et al. |
| 4,865,929 A | 9/1989 | Eck |
| 5,015,545 A | 5/1991 | Brooks |
| 5,034,290 A | 7/1991 | Sands et al. |
| 5,141,826 A | 8/1992 | Böhm et al. |
| 5,146,149 A | 9/1992 | Nilssen |

(Continued)

FOREIGN PATENT DOCUMENTS

DE          4029018 A1      3/1992

(Continued)

*Primary Examiner*—Stephen J. Kalafut
(74) *Attorney, Agent, or Firm*—Brinks Hofer Gilson & Lione; G. Peter Nichols

(57) ABSTRACT

A battery venting system that is useful for cordless power tools. The system can include a cell that may have a sleeve with a plurality of apertures surrounding a peripheral side face of the cell to enhance heat dissipation from the cell. A plurality of cells may be electrically connected to form a cell pack. A carrier includes an upper carrier and a lower carrier to sandwich a plurality of cells that are aligned parallel to each other. The carriers include at least one vent hole that are aligned with a gap formed from adjacent cells to define an elongated fluid flow path. A charger may be provided to receive a housing containing the carrier and may be provided with a fan to direct a flow into the fluid flow path.

21 Claims, 4 Drawing Sheets

U.S. PATENT DOCUMENTS

| | | | |
|---|---|---|---|
| 5,158,841 A | 10/1992 | Mennicke et al. |
| 5,204,609 A | 4/1993 | Alisauski |
| 5,208,525 A | 5/1993 | Lopic et al. |
| 5,229,702 A | 7/1993 | Boehling et al. |
| 5,268,242 A | 12/1993 | Morandi |
| 5,268,629 A | 12/1993 | Franke |
| 5,298,821 A | 3/1994 | Michel |
| 5,322,745 A | 6/1994 | Yanagihara et al. |
| D349,884 S | 8/1994 | Iino |
| 5,338,624 A | 8/1994 | Gruenstern et al. |
| 5,385,793 A | 1/1995 | Tiedemann et al. |
| 5,396,162 A | 3/1995 | Brilmyer |
| 5,410,237 A | 4/1995 | Sharrah et al. |
| 5,432,026 A | 7/1995 | Sahm et al. |
| 5,447,807 A | 9/1995 | Peled et al. |
| 5,456,994 A | 10/1995 | Mita |
| 5,461,299 A | 10/1995 | Bruni |
| 5,510,208 A | 4/1996 | Hall et al. |
| 5,553,675 A | 9/1996 | Pitzen et al. |
| 5,571,630 A | 11/1996 | Cheiky |
| 5,578,392 A | 11/1996 | Kawamura |
| 5,583,418 A | 12/1996 | Honda et al. |
| 5,585,204 A | 12/1996 | Oshida et al. |
| 5,589,290 A | 12/1996 | Klink et al. |
| 5,620,057 A | 4/1997 | Klemen et al. |
| 5,639,571 A | 6/1997 | Waters et al. |
| 5,642,028 A | 6/1997 | Tai et al. |
| 5,648,712 A | 7/1997 | Hahn |
| 5,652,500 A | 7/1997 | Kadouchi et al. |
| 5,663,007 A | 9/1997 | Ikoma et al. |
| 5,671,815 A | 9/1997 | Kabatnik et al. |
| 5,680,030 A | 10/1997 | Kadouchi et al. |
| 5,695,891 A | 12/1997 | Misra et al. |
| 5,721,064 A | 2/1998 | Pedicini et al. |
| 5,763,116 A | 6/1998 | Lapinski et al. |
| 5,800,942 A | 9/1998 | Hamada et al. |
| 5,816,121 A | 10/1998 | Yoshimizu et al. |
| 5,847,545 A | 12/1998 | Chen et al. |
| 5,851,695 A | 12/1998 | Misra et al. |
| 5,856,037 A | 1/1999 | Casale et al. |
| 5,866,276 A | 2/1999 | Ogami et al. |
| 5,879,831 A | 3/1999 | Ovshinsky et al. |
| 5,926,005 A | 7/1999 | Holcomb et al. |
| 5,991,665 A | 11/1999 | Wang et al. |
| 6,007,942 A | 12/1999 | Mistry |
| 6,023,146 A | 2/2000 | Casale et al. |
| 6,025,086 A | 2/2000 | Ching |
| 6,051,336 A | 4/2000 | Dougherty et al. |
| 6,066,938 A | 5/2000 | Hyodo et al. |
| 6,084,379 A | 7/2000 | Buniatyan |
| 6,091,224 A | 7/2000 | Morita |
| 6,102,632 A | 8/2000 | Potter et al. |
| 6,106,962 A | 8/2000 | Pedicini et al. |
| 6,111,387 A | 8/2000 | Kouzu et al. |
| 6,174,618 B1 * | 1/2001 | Nishiyama et al. ........... 429/99 |
| 6,187,470 B1 | 2/2001 | Peterson |
| 6,188,202 B1 | 2/2001 | Yagi et al. |
| 6,197,445 B1 | 3/2001 | Ward et al. |
| 6,203,940 B1 | 3/2001 | Oltman et al. |
| 6,204,639 B1 | 3/2001 | Takano et al. |
| 6,210,826 B1 | 4/2001 | Dopp et al. |
| 6,210,827 B1 | 4/2001 | Dopp et al. |
| 6,211,645 B1 | 4/2001 | Kouzu et al. |
| 6,211,646 B1 | 4/2001 | Kouzu et al. |
| 6,218,807 B1 | 4/2001 | Sakaue et al. |
| 6,221,524 B1 | 4/2001 | Andrew et al. |
| 6,225,788 B1 | 5/2001 | Kouzu et al. |
| 6,236,187 B1 | 5/2001 | Chen |
| 6,255,014 B1 | 7/2001 | Dougherty et al. |
| 6,255,015 B1 | 7/2001 | Corrigan et al. |
| 6,261,709 B1 | 7/2001 | Passaniti et al. |
| 6,265,845 B1 | 7/2001 | Bo et al. |
| 6,296,961 B1 | 10/2001 | Moy et al. |
| D450,035 S | 11/2001 | Ahlgren |
| 6,312,851 B1 | 11/2001 | Fukuda et al. |
| 6,335,116 B1 | 1/2002 | Yamane et al. |
| 6,339,312 B2 | 1/2002 | Sakaue et al. |
| 6,342,773 B2 | 1/2002 | Sakaue et al. |
| 6,346,341 B1 | 2/2002 | Witzigreuter |
| 6,368,738 B1 | 4/2002 | Passaniti et al. |
| 6,373,228 B1 | 4/2002 | Sakakibara |
| 6,379,837 B1 | 4/2002 | Takahashi et al. |
| 6,399,238 B1 | 6/2002 | Oweis et al. |
| 6,410,184 B1 | 6/2002 | Horiuchi et al. |
| 6,410,185 B1 | 6/2002 | Takahashi et al. |
| 6,411,063 B1 | 6/2002 | Kouzu et al. |
| 6,433,509 B2 | 8/2002 | Kobayashi et al. |
| 6,436,571 B1 | 8/2002 | Passaniti et al. |
| 6,440,601 B1 | 8/2002 | Aoi et al. |
| 6,455,186 B1 | 9/2002 | Moores, Jr. et al. |
| 6,465,123 B1 | 10/2002 | Baumann et al. |
| 6,479,185 B1 | 11/2002 | Hilderbrand et al. |
| 6,482,542 B1 | 11/2002 | Takaki et al. |
| 6,498,406 B1 | 12/2002 | Horiuchi et al. |
| 6,627,345 B1 * | 9/2003 | Zemlok et al. ........... 429/99 |
| 2001/0008720 A1 | 7/2001 | Pedicini et al. |
| 2001/0046624 A1 | 11/2001 | Goto et al. |
| 2002/0012832 A1 | 1/2002 | White et al. |
| 2002/0028376 A1 | 3/2002 | Yamane et al. |
| 2002/0034682 A1 | 3/2002 | Moores, Jr. et al. |
| 2002/0187390 A1 * | 12/2002 | Kimoto et al. ........... 429/99 |
| 2002/0197527 A1 | 12/2002 | Moores, Jr. et al. |

FOREIGN PATENT DOCUMENTS

| | | |
|---|---|---|
| DE | 4205992 A1 | 9/1993 |
| DE | 10055158 A1 | 7/2001 |
| EP | 920 105 A2 | 2/1999 |
| EP | 940 864 A2 | 9/1999 |
| EP | 1 100 173 A2 | 5/2001 |
| EP | 1 178 556 A2 | 2/2002 |
| EP | 1 178 557 A2 | 2/2002 |
| EP | 1 178 559 A2 | 2/2002 |
| JP | 8-185898 | 7/1996 |
| JP | 10-27591 | 1/1998 |
| JP | 10-189061 | 7/1998 |
| JP | 10-75327 | 3/1999 |
| JP | 11-22829 | 4/1999 |
| JP | 2000-12107 | 1/2000 |
| JP | 2000-36327 | 2/2000 |
| JP | 2000-48864 | 2/2000 |
| JP | 2000-58138 | 2/2000 |
| JP | 2000-156251 | 6/2000 |
| JP | 2000-182582 | 6/2000 |
| JP | 2000-215922 | 8/2000 |
| JP | 2001-143768 | 5/2001 |
| JP | 2001-325995 | 11/2001 |
| JP | 2002-8735 | 1/2002 |

* cited by examiner

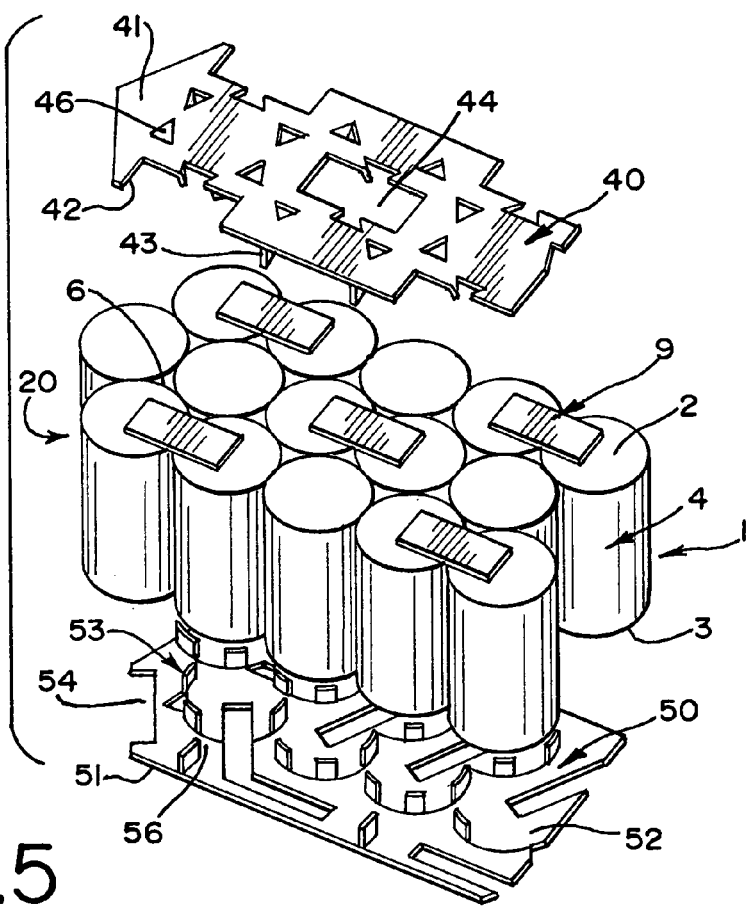
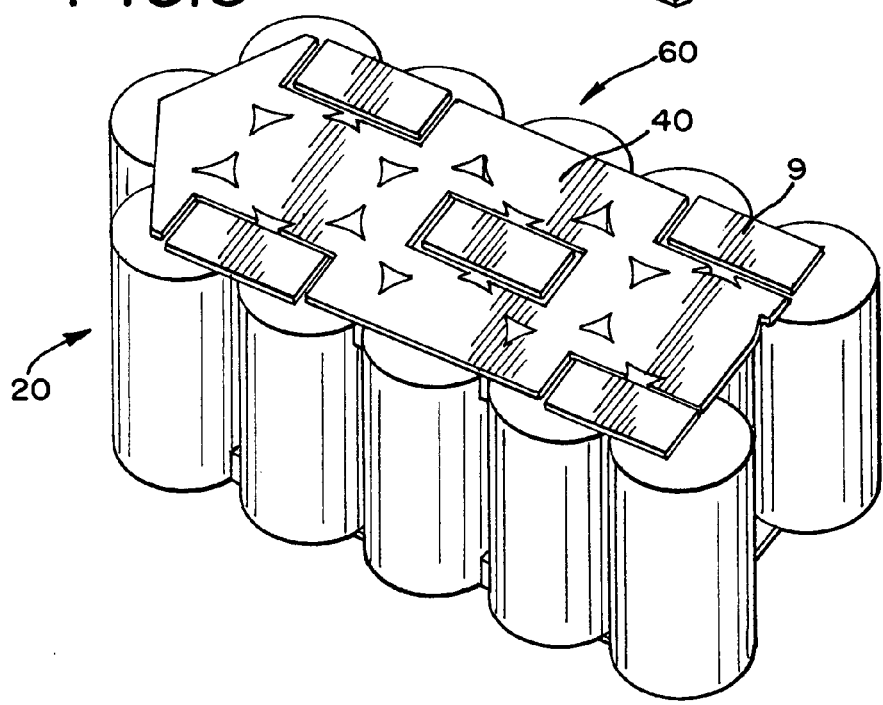

BATTERY VENTING SYSTEM

BACKGROUND OF THE INVENTION

The present invention relates generally to a battery venting system that is useful for cordless power tools. The system includes one or more of battery cells, sleeves that may surround the battery cell, a carrier that can position and hold a number of battery cells to form a cell pack, and a charger useful with the battery cells and/or carrier.

Rechargeable nickel-cadmium cells and nickel-metal hydride cells are widely used as a battery power source for portable apparatus, such as power tools. Typically, nickel-cadmium cells or nickel-metal hydride cells are used in the form of a cylindrical cell that has a cylindrical shape. In the portable apparatus, the cylindrical cells are used alone or more typically in the form of a cell pack in which a plurality of cells are connected and are contained within a housing that can be removably attached to an apparatus.

FIG. 1 shows a typical cylindrical cell, which has a cylindrical case 1 that contains the cell materials in a closed fashion by a cover 11. A conductive projection 11a is formed in the cover 11, and a safety valve for releasing gasses is disposed in the projection 11a. Generally, the cover 11 having the projection 11a the positive electrode and the case 12 is the negative electrode. A sleeve 13 usually surrounds the peripheral side of the cell and is formed from an electrically insulating material so that when the battery cells are intentionally or unintentionally touching each other at the peripheral side face, the battery cells will not short out or discharge.

When the cylindrical cell 1 is to be used as a power source for an apparatus, a plurality of cells are connected to each other to form a cell pack, as shown in FIG. 2. Adjacent cells 1 are bridged by an electrically conductive plate 9, such as a nickel plate. The plate may be attached by spot-welding or other methods of attaching to the projection 11a of the cover 11 of one of the cells and the bottom face of the case 12 of the other cell, respectively. To further secure and position the plurality of cells, it is known to wrap the periphery of the outermost cells with a shrinkable plastic or tape.

A disadvantage to providing an electrically insulating case around each cell is that when a plurality of cells are provided to form a cell pack, heat generated upon discharge and upon recharging operations is not easily dissipated. Likewise, when a cell pack is wrapped with shrinkable plastic or tape, the generated heat is further hindered from dissipation. When the temperature of the cell is raised as a result of the heat generation, self-discharge may reduce the cell capacity or shorten the service life of the cell. This problem is also applicable to sealed-type cells or other types such as rectangular cells.

Accordingly, there have been attempts to address this issue by providing cell holders such as that shown in U.S. Pat. No. 5,578,392, particularly FIG. 13. There, a cell holder is provided to hold and position individual battery cells. In this cell holder, an upper and a lower plate is provided to respectively receive the upper and lower portion of the individual cells. Each plate has a plurality of spaced apart cell holes into which a portion of the upper or lower portion of a battery cell can be received. Accordingly, a gap is formed between adjacent cells to facilitate heat dissipation during discharge and charging operations. Although this solution may be useful, the plates take up space within the battery pack housing and by virtue of their size still hinder heat dissipation.

BRIEF SUMMARY OF THE INVENTION

With the above in mind, in one aspect of the present invention, a battery cell having a first terminal and a second terminal is provided without an outer case or covering. In one embodiment, the battery cell may be cylindrically shaped with a first end having a first terminal and a second end spaced from the first end and having a second terminal. A longitudinal axis extends from the first end to the second end. A peripheral side face is disposed between the first end and the second end.

In another aspect of the present invention, a battery cell is provided with a sleeve to surround the peripheral side face of the cell. The sleeve is formed from an electrically insulating material and has a plurality of apertures. The sleeve may be formed form paper, plastic, or any other suitable electrical insulating material. The sleeve may also be formed of a plastic mesh such as a molded plastic mesh.

The apertures may have a variety of suitable shapes such that the peripheral side face of the cell is sufficiently exposed to allow heat to dissipate while still allowing the cell to be insulated when contacted by a similar cell having a sleeve. Suitable aperture shapes include those selected from a circle, ellipse, parabola, crescent, obround, disc, triangle, rectangle, polygon, and mixtures thereof. Where the aperture has a shape that provides a longer side (or a pair of longer sides) and a short side (or a pair of shorter sides, like an obround, the longer side(s) may be arranged to be parallel to the longitudinal axis. Alternatively, the longer side(s) may be arranged to be normal to the longitudinal axis.

In yet another aspect of the present invention, a carrier of a plurality of battery cells is provided to arrange and hold the plurality of battery cells to define a cell pack. The carrier may be used with battery cells without an outer case, with battery cells having an outer case, or with battery cells having electrically non-conductive sleeves according to the present invention. In one embodiment, the carrier causes the terminals on each end of the cells to be positioned in a substantially same plane.

In this cell pack, a plurality of cells are arranged side-by-side and are generally parallel to their longitudinal axis. An electrically conductive connecting member connects the cells with each other. The electrically conductive material may be configured of a flexible material. Even when vibration or shock is applied to the cell pack, therefore, the force acting between the cylindrical cells is absorbed by the flexible material of the connecting member.

It is a still further object of the invention to provide a cell carrier in which upper and lower end portions of sealed-type cells are held by a respective upper carrier and lower carrier to define a vent space between adjacent battery cells, thereby allowing heat generated from the sealed-type cells to be dissipated to the exterior via the vent hole. The upper carrier and lower cell carrier are provided with apertures that are aligned with the vent space to define an elongated fluid flow path to allow heat to be dissipated. The upper carrier and lower carrier are also provided with a connecting member receiving area.

According to the present invention, a plurality of battery cells are held between the pair of upper and lower carriers and heat generated from the cells can be dissipated via the elongated fluid flow path. Since the outward-directed peripheral side faces of the battery cells may be free of electrically insulating material and are exposed to the exterior between the pair of upper and lower carriers, heat can also be dissipated from the peripheral side faces of each battery cell. Alternatively, if a sleeve according to the present invention is provided, i.e., with a plurality of apertures, a substantial portion the peripheral side faces of the battery cells will be exposed to the exterior between the pair of upper and lower carriers so that heat can be dissipated from the peripheral side faces of each battery cell.

The venting effect can be further enhanced by forcing a fluid such as air past and through the cell pack. For example, in another aspect of the present invention, a charger is provided with a fan to force a fluid into the cell pack where it can pass through adjacent cells. Advantageously, the charger may be configured to provide charging of more than a single cell pack, either sequentially or simultaneously. The charger is provided with a mechanism to simultaneously force fluid into two separate cell, while charging.

The cell pack may be provided with contacts that operatively associated with the cell pack to act as a conduit to transfer electricity to the motor of a power tool or to receive a charge from a charger. In addition, the cell pack may be provided with an outer casing or housing, typically formed of plastic to define a battery pack.

Additional aspects, objects, and advantages of the invention will become apparent from the detailed description, the appended claims, and accompanying drawings, as well as by practice of the invention.

BRIEF DESCRIPTION OF THE DRAWINGS

The accompanying drawings illustrate an embodiment of the invention and together with the description serve to explain the principles of the invention. In the drawings, the same reference numerals indicate the same parts.

FIG. 4 is a perspective exploded view of a carrier for a plurality of cylindrical battery cells electrically connected to define a cell pack.

FIG. 5 is a perspective view of a carrier for a plurality of cylindrical battery cells electrically connected to define a cell pack.

DETAILED DESCRIPTION OF THE INVENTION

Figure 1:
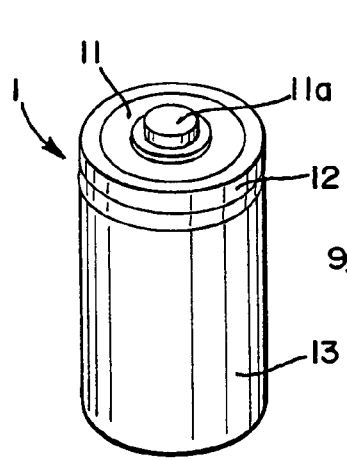
FIG. 1 is a perspective view of a prior art cylindrical battery cell.

Referring now to the drawings and initially to FIG. 1, a prior art battery cell is shown. The prior art battery cell 1 has a cylindrical case that contains the cell materials in a closed fashion by a cover 11. A conductive projection 11a is formed in the cover 11, and a safety valve for releasing gasses is disposed in the projection 11a. Generally, the cover 11 having the projection 11a is the positive electrode and the case 12 is the negative electrode. Generally, an outer sleeve 13 is formed from an electrically insulating material so that when the battery cells are intentionally or unintentionally touching each other at the peripheral side face, the battery cells will not discharge.

Figure 2:
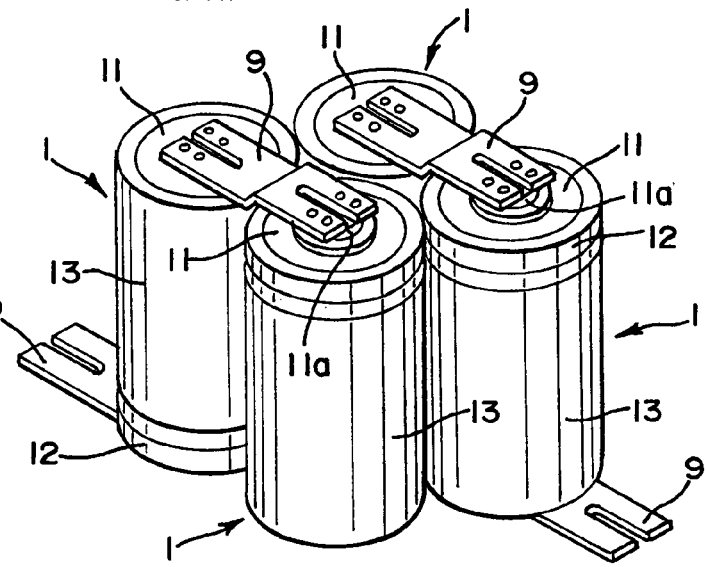
FIG. 2 is a perspective view of a plurality of cylindrical battery cells electrically connected to define a cell pack.

When the prior art cylindrical cell 1 is to be used as a power source for an apparatus, generally, a plurality of cells are connected to each other to form a cell pack, as shown in FIG. 2. Two adjacent cells 1 are bridged by an electrically conductive plate 9, such as a nickel plate. The plate 9 may be attached by spot-welding or other method of attaching the plate 9 to the projection 11a of the cover 11 of one of the cells and the bottom face of the case 12 of the other cell, respectively. The sleeve 13 acts to prevent adjacent cells from shunting. In the description of the embodiments of the present invention, components having the same function as those of the prior art described above with respect to FIGS. 1 and 2 are designated by the same reference numerals.

Figure 3:
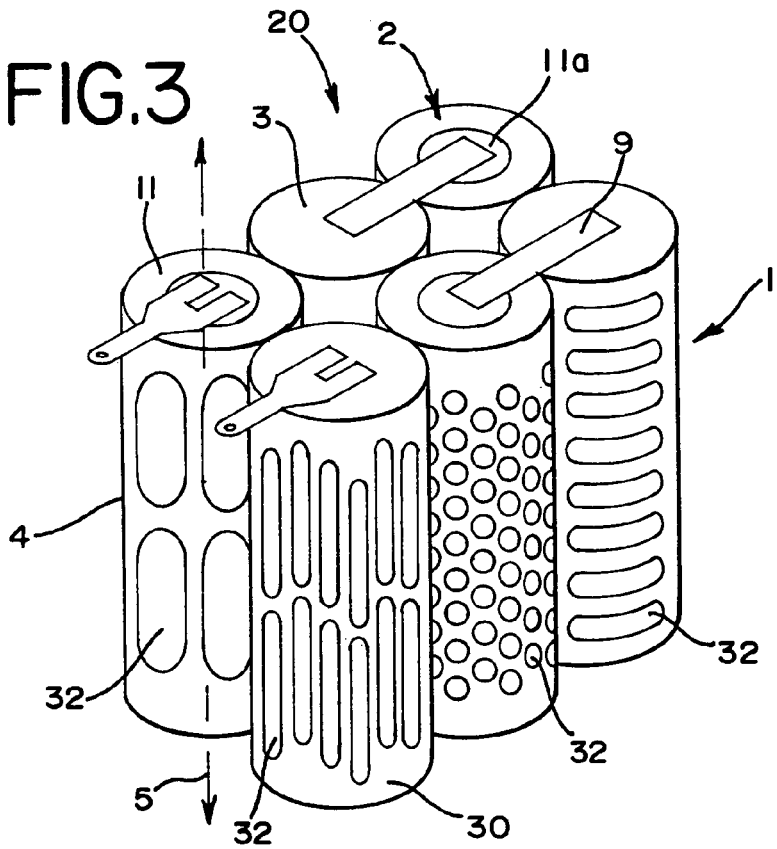
FIG. 3 is a perspective view of a plurality of cylindrical battery cells having sleeves according to the present invention and being electrically connected to define a cell pack.

Turning now to FIG. 3, one embodiment of the present invention is shown. Although the cell 1 is depicted with a cylindrical shape, it is to be understood that the cell 1 can have any suitable shape presently known or that can be contemplated in the future. In general, the cell 1 has a first end 2 end and a second end 3 spaced from the first end 2 to define a peripheral side face 4 that extends from the first end 2 to the second end 3. A longitudinal axis 5 extends from the first end 2 to the second end 3 of the cell 1. The first end 2 has a cover 11 from which a projection 11a extends. The projection 11a defines a positive electrode or terminal. The second end 3 defines a negative electrode or terminal. While the cell 1 may be a nickel-cadmium cell or a nickel-metal hydride cell, the present invention is not restricted those types of cells.

According to another embodiment of the present invention, the cell 1 is provided with a sleeve 30 that surrounds the peripheral side face 4 of the cell 1. The sleeve 30 made be made of any suitable electrically insulating material. For example, the sleeve 30 may be made from paper, plastic, or any other suitable insulating materials. The sleeve 30 may be a molded plastic mesh or similar construction.

Desirably, the sleeve 30 is provided with a plurality of apertures 32 to allow heat to dissipate from the cell 1. The apertures 32 may have any suitable shapes such that the cell 1 is sufficiently exposed to allow heat to dissipate while still allowing the cell 1 to be insulated when contacted by a similar cell 1 having a sleeve 30. Suitable shapes include those selected from a circle, ellipse, parabolic, crescent, obround, disc, triangle, rectangular, polygonal, and mixtures thereof. Where the aperture 32 has a shape that provides a longer side (or a pair of longer sides) and a short side (or a pair of shorter sides, like an obround, the longer side(s) may be arranged to be parallel to the longitudinal axis 5. Alternatively, the longer side(s) may be arranged to be normal to the longitudinal axis 5.

To form a cell pack 20, a plurality of individual cells 1 are electrically connected to each other. FIG. 3 shows the case where a cell pack is configured by six cylindrical cells 1. One skilled in the art will understand that this embodiment of the present invention is applicable to any number of battery cells and is applicable to any shape of battery cell. Of course, in the case where two or more cells 1 are used, a cell pack 20 is configured by connecting the cells 1 to each other by an electrically conductive connecting member 9. Instead of connecting the cells 1 in series, the cells 1 may be connected in parallel or in a combination of series and parallel connections. Accordingly, the connecting member 9 may connect adjacent positive terminals, adjacent negative terminals, both, or adjacent positive and negative terminals.

The electrically conductive connecting member 9 may be formed from any suitable electrically conductive material. Non-limiting examples include nickel, nickel and steel composites, steel, or nonferrous conductive material. The electrically conductive connecting member 9 may be attached by spot welding or by any other suitable attachment method such as laser welding.

Next, with reference to FIGS. 4 and 5, an embodiment of the carrier of the present invention in which fifteen cylindrical cells are held will be described. In the present invention, however, the kind and shape of the cell 1 are not restricted to nickel-cadmium or nickel-metal hydride and conventional manganese cells or sealed-type cells of other types such as those of rectangular cells may be used. In addition, while the present invention will be illustrated and described with fifteen cells, one skilled in the art will appreciate that the carrier will be suitable for use with any number of cells, for example, twelve, ten, seven, four, or even two depending on the desired voltage output.

As shown in FIG. 4, the fifteen cells 1 are arranged in three rows with each row consisting of five cells 1. The fifteen cells 1 are sandwiched between an upper carrier 40 and a lower carrier 50 to define a carrier 60. Desirably, the upper carrier 40 and lower carrier 50 are made of an electrically insulating material such as a synthetic resin. The upper carrier 40 and the lower carrier 50 have a significant portion that is substantially flat. The thickness of the upper carrier 40 and the lower carrier 50 ranges from about 0.25 mm to about 25 mm, desirably from about 0.5 mm to about 10 mm, more desirably from about 0.75 mm to about 1.25 mm. The upper carrier 40 and lower carrier 50 are used while being disposed opposing each other.

The upper carrier 40 has an upper surface 41 and a lower surface 42, which faces the battery cells 1. The upper carrier 40 has a plurality of ribs 43 extending outward from the lower surface 42. The ribs 43 are located on the upper carrier 40 in certain areas to cooperatively interact with and engage the battery cells 1 to correctly position them with respect to each other. In this regard, the ribs 43 are spaced from each other and therefore they do not completely surround the cell 1.

The number of ribs 43 provided will be that necessary to selectively position the number of cells 1 forming the desired cell pack 20. in addition, when the upper carrier 40 is placed on the plurality of battery cells 1 the ribs 43 extend from upper carrier 40 a distance substantially less than the distance from the top 2 to the bottom 3 of the cell 1. Because the cell 1 may have any of a variety of different shapes and heights, the length of the ribs 43 will vary depending on the shape of the cell 1. Desirably, the ribs 43 extend a distance less than one-half the distance from the top 2 to the bottom 3 of the cell 1. For example, the ribs 43 extend from the lower surface 42 a distance ranging from about 0.5 mm to about 10 mm, desirably from about 3 mm to about 6 mm.

The upper carrier 40 is provided with shaped cut-outs 44 that substantially conform to the shape of the electrically conductive connecting member 9. Thus, when the connecting member 9 is rectangular, the cut-out 44 will likewise have a rectangular shape with dimensions substantially the same (slightly larger) as the dimensions of the connecting member 9. The thickness of the upper carrier 40 may be substantially the same as the thickness of the connecting member 9 so that when the upper carrier 40 is placed on top of the plurality of cells 1 forming the cell pack 20, the upper surface of the connecting member 9 and the top surface 41 of the upper carrier 40 will lie in substantially the same plane. Alternatively, the connecting member 9 can have a thickness slightly less than the thickness of the upper carrier 40 so that the connecting member 9 does not extend beyond the top surface 41 of the upper carrier 40.

The upper carrier 40 is also provided with a plurality of vent openings 46. In general, the vent openings 46 are provided on the upper carrier 40 at a location that is aligned with a gap 6 formed by adjacent cells 1. For example, referring to FIG. 4, a gap 6 is formed by three adjacent cells 1. By providing vent openings 46 on the upper carrier 40, fluid flowing through the gap 6 can also flow through the vent openings 46 to more effectively dissipate heat generated by the cells 1.

The lower carrier 50 has a lower surface 51 and an upper surface 52, which faces the battery cells 1. The lower carrier 50 has a plurality of ribs 53 extending outward from the upper surface 52. The ribs 53 are located on the upper carrier 50 in certain areas to cooperatively interact with and engage the battery cells 1 to correctly position them with respect to each other. In this regard, the ribs 43 are spaced from each other and therefore they do not completely surround the cell 1. In addition, the ribs 53 are also located in areas on the lower carrier 50 so that when the upper carrier 40 and the lower carrier 50 are placed on the cells 1 to effectively sandwich the cells 1, the cells 1 will be aligned substantially vertically and parallel to each other, i.e., parallel to the longitudinal axis 5.

The number of ribs 53 provided will be that necessary to selectively position the number of cells 1 forming the desired cell pack 20. When the lower carrier 50 is placed on the plurality of battery cells 1 the ribs 53 extend from lower carrier 40 a distance substantially less than the distance from the bottom 3 to the top 2 of the cell 1. Because the cell 1 may have any of a variety of different shapes and heights, the length of the ribs 53 will vary depending on the shape of the cell 1. Desirably, the ribs 53 extend a distance less than one-half the distance from the bottom 3 to the top 2 of the cell 1. For example, the ribs 53 extend from the upper surface 52 a distance ranging from about 0.5 mm to about 10 mm, desirably from about 3 mm to about 6 mm.

The lower carrier 50 is provided with shaped cut-outs 54 that substantially conform to the shape of the electrically conductive connecting member 9. Thus, when the connecting member 9 is rectangular, the cut-out 54 will likewise have a rectangular shape with dimensions substantially the same (slightly larger) as the dimensions of the connecting member 9. The thickness of the lower carrier 50 may be substantially the same as the thickness of the connecting member 9 so that when the lower carrier 50 is placed on the plurality of cells 1 forming the cell pack 20, the exposed surface of the connecting member 9 and the lower surface 51 of the lower carrier 50 will lie in substantially the same plane. Alternatively, the connecting member 9 can have a thickness slightly less than the thickness of the lower carrier 50 so that the connecting member 9 does not extend beyond the lower surface 51 of the lower carrier 50.

The lower carrier 50 is also provided with a plurality of vent openings 56. In general, the vent openings 56 are provided on the lower carrier 50 at a location that is aligned with a gap 6 formed by adjacent cells 1. For example, referring to FIG. 4, a gap 6 is formed by three adjacent cells 1. In addition, the vent openings 56 provided on the lower carrier 50 are aligned with the vent openings 46 provided on the upper carrier 40. By aligning the vent openings 46, 56 and the gap 6, fluid flowing through the gap 6 can also flow through the vent openings 46, 56 to more effectively dissipate heat generated by the cells 1.

As shown in FIG. 5, the carrier 60 causes the cells 1 to be positioned in such a manner that the end portions 2 and 3 are in the substantially same plane. In this case, the electrically conductive connecting member 9 is not required to be bent and can be made flat so that the terminals are easily connected to each other.

In addition, In the cell pack shown in FIG. 5, in which the cylindrical cells 1 are held by the carrier 60, as described above, ventilation is enabled between the exterior and the vicinity of the inward-directed peripheral side faces of the cylindrical cells 1, via the vent openings 46, 56 provided in the upper carrier 40 and lower carrier 50, respectively, which as noted above are longitudinally aligned. Consequently, heat generated from the cylindrical cells 1 can be rapidly dissipated to the exterior and the temperature rise of the cylindrical cells 1 is reduced so that it does not exceed the specified range.

It is believed that the cells 1 closest to the center of the cell pack 20 tend to cool slower than those cells farthest from the center of the pack. Therefore, the size of the vent openings 46, 56 can be varied so that the vent openings 46, 56 closest to the center of the cell pack 20 are larger than the vent openings farthest from the center of the cell pack 20.

The ventilation due to the vent openings 46, 56 and the like can occur as a result of natural convection. When the amount of generated heat is expected to be large or is large, the natural convection can be enhanced by providing a fluid moving device to force a fluid around the outward directed peripheral side face 4 of the cells 1 and through the vent openings 46, 56 provided in the upper carrier 40 and lower carrier 50.

The carrier 60 of the present invention may be used with cells 1 that are bare or do not have any insulating cover. In this instance, the ribs 43, 53 are located on the upper carrier 40 and lower carrier 50, respectively so that adjacent cells 1 do not touch. As a result, effective heat dissipation can occur. Alternatively, the carrier 60 of the present invention may be used with cells 1 that are provided with sleeves 30 according to the present invention or with standard known cells.

A filter (not shown) may be placed adjacent each of the upper carrier 40 and lower carrier 50 to reduce or prevent dust entering the cell pack 20. The filter may be any suitable material such as a synthetic fiber mesh.

The cell pack may also have a temperature indicating device to indicate the temperature of one or more cells 1 in the cell pack 20. The temperature indicating device may be thermistor, a capacitor, a theromostat, or other temperature indicating device.

One skilled in the art will understand that the cell pack of the present invention can be provided with one or more electrical contacts that operatively associated with the cell pack 20. The electrical contacts act as a conduit of electricity from the cell pack 20 to the motor of a power tool with which the cell pack 20 is associated. In addition, the electrical contacts act to transfer the charge from a charger so that the cells in the cell pack 20 can be recharged.

Figure 6:
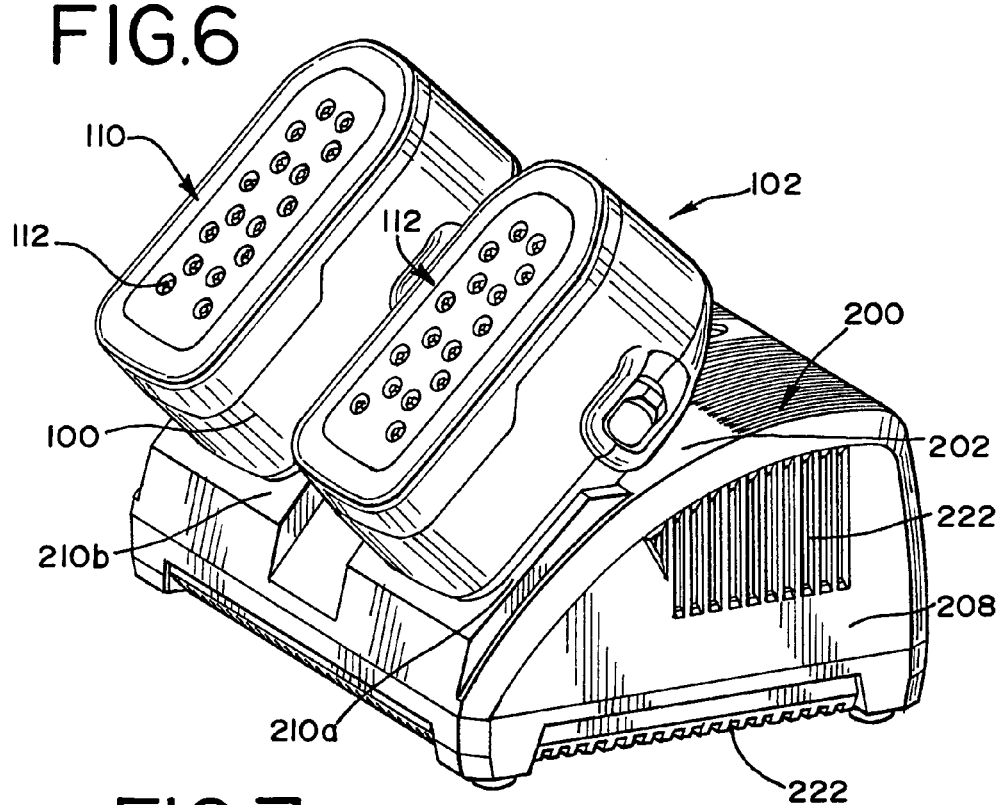
FIG. 6 is a perspective view of a battery charger useful for simultaneously charging two batteries and containing a venting system according to one aspect of the present invention.
Figure 7:
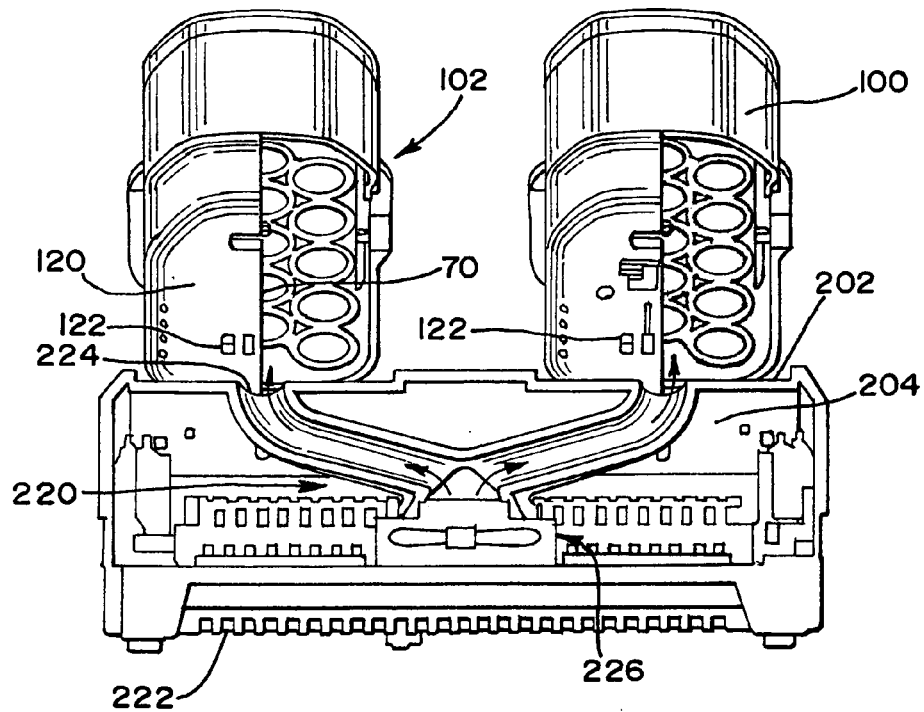
FIG. 7 is a rear cut-away view of the charger with elements removed to better illustrate the venting system of the present invention. One embodiment of the duct that forms a portion of the venting system is shown with a portion removed to better illustrate the flow of fluid through the duct and to a battery pack that houses the carrier of the present invention. A portion of the battery pack housings are cut-away to show the carrier. In addition, the battery pack housings are is shown just before engagement with the charger.
Figure 8:
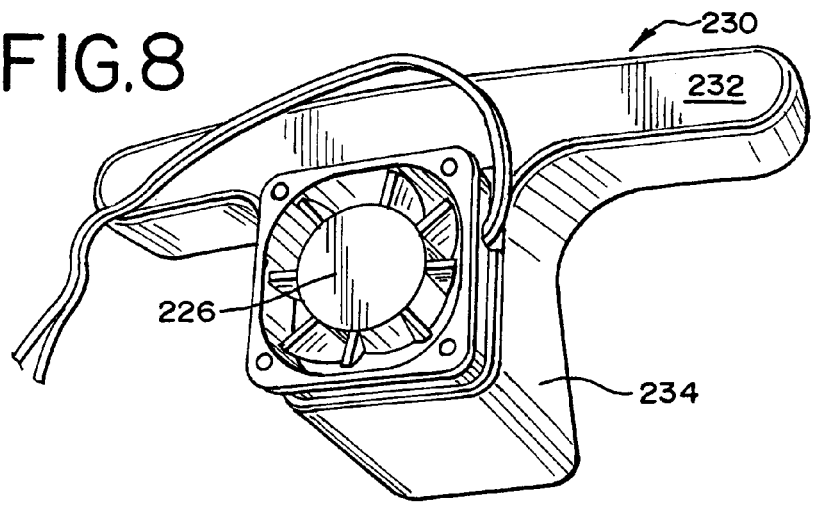
FIG. 8 is a bottom view of a portion of a venting system for a battery charger according to one aspect of the present invention.
Figure 9:
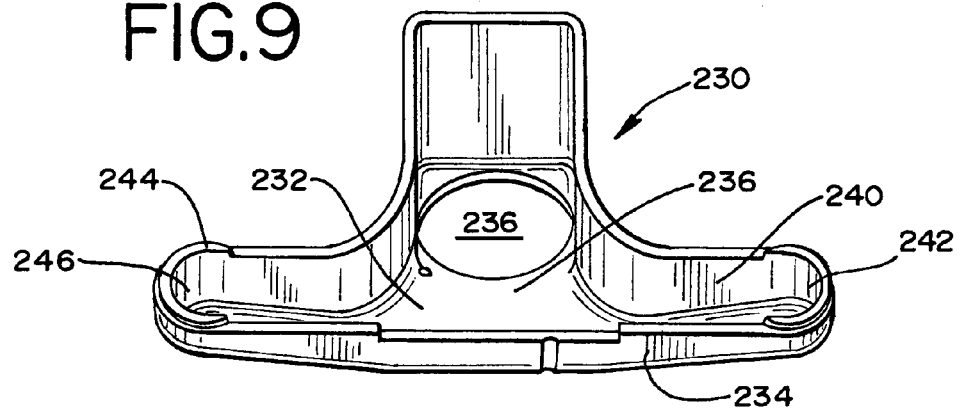
FIG. 9 is a bottom view of one embodiment of a duct that forms a portion of the venting system useful in a battery charger that is capable of receiving two battery packs.
Figure 10:
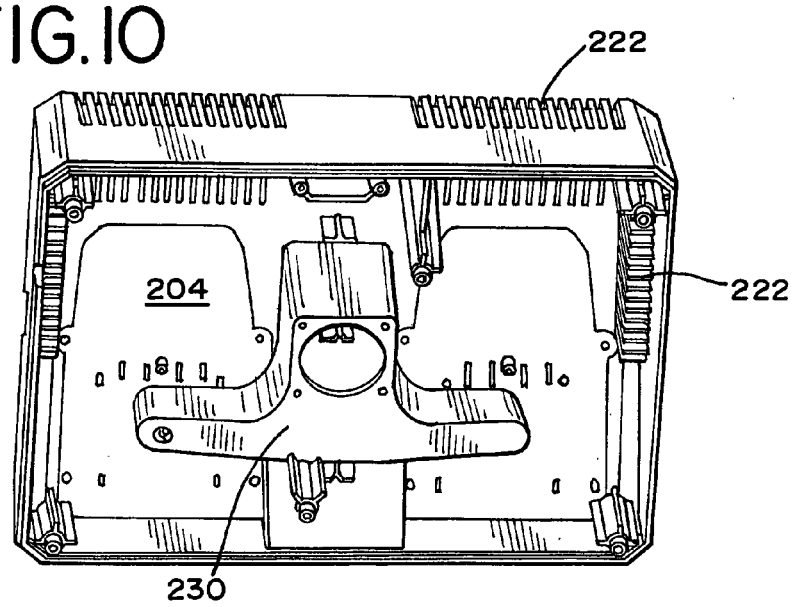
FIG. 10 is a bottom view of a battery charger that is capable of receiving two battery packs and the duct of FIG. 9 that forms a portion of the venting system. Certain parts of the battery charger and venting system are not shown to better illustrate the duct.

In addition, it is customary to provide a housing 100 that surrounds the cells 1 and cell pack 20 to define a battery pack 102. In this regard, FIG. 6 shows a battery charger 200 incorporating a venting system 220 and having two battery packs 102 operatively associated with the charger 200. The housing 100 may be formed from any suitable material but is typically formed of a hard plastic to aid in protecting the cells. The upper 110 and lower 120 faces of the battery pack 102 may contain vents 112, 122 to allow fluid to pass through the housing 100 and the vents 46, 56 provided on the upper carrier 40 and the lower carrier 50. Although it is understood that the upper 110 and lower 120 faces of the battery pack 102 are relative, for ease of description, the upper face 110 of the battery pack 102 will be considered to be that face adjacent the upper carrier 40 and the lower face 120 of the battery pack 102 will be considered to be that face adjacent the lower carrier 50. The battery pack 102 may be slideably engaged with a power tool such that the battery pack 102 can be removed from the power tool and placed in a charger 200 for recharging the cells 1.

The charger 200 includes a housing having one surface that receives a battery pack. For convenience the charger 200 will be described as having a top 202, a bottom 204, and at least one side 208. It will be understood, however, that the configuration of the charger 200 is not particularly important so long as the features described below are incorporated. In addition, for convenience, the one surface will be referred to as the top surface 202. The top surface 202 is provided with at least one slot 210 to removably receive a battery pack. In a desired embodiment, the charger 200 is provided with two slots 210a, 210b to simultaneously receive two separate battery packs 102. Each slot 210 has respective contacts to couple with the electrical contacts 70 associated with the cell pack 20 to charge the cells 1. The charging of the cells 1 may be controlled by a switch, a microcontroller, a circuit or the like. Methods of designing and operating the charging mechanism are known and any of several different operating schemes may be used.

The charger 200 further includes a venting system 220 that includes an inlet 222, an outlet 224, a fan 226, and a duct 230 to direct fluid from the fan 226 to the outlet 224. The outlet 224 is associated with vents 122 provided on the lower face 120 of the battery housing 100 so that fluid flows from the fan 226, through the duct 230, into the battery housing 100 and through the vents 56 in the lower carrier 50, across the cells 1 and out the vents 46 in the upper carrier 40 and the vents 112 in the upper face 110 of the battery housing 100. Alternatively, the fan 226 may be arranged to suck fluid from the outlet 224 to the inlet 222 so that the fluid is moved from the vents 112 on the battery housing 100 through the vents 46 in the upper carrier 40, across the cells 1 through the vents 56 in the lower carrier 50 and into the duct 230. It will be understood by one skilled in the art the terms inlet and outlet are relative to the direction of the fan flow. For ease description, the fan flow will be described as moving fluid from the charger housing 200 into the battery housing 100. Accordingly, the outlet 224 of the charger housing 200 will be disposed on the top 202 of the charger housing 200 and will be associated with the vents 122 provided on the lower face 120 of the battery housing 100.

As noted above, the venting system 220 includes an inlet 222 that may be provided on the top 202 of the charger housing 200, the bottom 206 of the charger housing 200, the side(s) 208 of the charger housing 200 or each of them. The inlet 222 may be provided by a grill, slots, or other types of openings such that fluid, typically air, can pass into the charger housing 200 to the fan 226. A filter may be provided adjacent the inlet to reduce or prevent particles such as dust from entering the charger housing 200.

The outlet 224 is provided on the top 202 of the charger housing 200 such that when a battery pack 102 is positioned on the charger 200, the outlet 224 is aligned with the vents 122 provided on lower face 120 of the battery pack 102 so that fluid may enter the battery pack 102. For example, the top 202 of the charger 200 has a slot 210 to receive the battery pack 102. The outlet 224 may be provided within the confines of the slot 210 or adjacent to the slot 210 so long as the outlet 224 is adjacent the vents 122 provided on the lower face 120 of the battery pack 102.

In the desired embodiment, the charger 200 is provided with two slots 210a and 210b so that two battery packs 102 may be simultaneously located on the charger 200. In this instance, at least one outlet 224a and 224b will be respectively associated with each slot 210a and 210b. A screen or grill may be located adjacent the outlet 224 to reduce or prevent dust, chips, or other things from entering the battery pack 102.

A duct 230 fluidically connects the fan 226 to the outlet 224. The duct 230 has a bottom wall 232 with a side wall 234 extending from the periphery of the bottom wall 232. The bottom wall 232 is provided with a central portion 236 having a first arm 240 and a second arm 244 connected with and extending from the central portion 236. The duct 230 is desirably formed with smooth contours to minimize flow and pressure gradients. The bottom 232 may be T-shaped, Y-shaped, or shaped in a similar fashion such that fluid can flow from a central portion 236 to the first 240 and second 244 arms. The bottom wall 232 has an aperture 238 to receive the fan 226. Desirably, the aperture 238 is provided in the central portion 236 so that fluid is distributed about equally to each of the first arm 240 and second arm 244 of the duct 230.

The first arm 240 terminates at a terminal end 242 and the second arm 244 terminates at a terminal end 246 with the terminal ends 242, 246 located adjacent respective outlets 224a, 224b. A seal may be provided between the terminal end of the arms 242, 246 and the outlet 224 to reduce or prevent fluid from by passing the outlet 224.

The duct 230 is desirably located within the charger housing 200 such that the underside 204 of the top 202 of the charger housing 200 forms a top surface of the duct 230. In this way, the duct 230 will be closed except for the portion that is adjacent to the outlet 224. Alternatively, the duct 230 can be provided with a top housing (not shown) to enclose the side wall 234 except at the terminal end of the arms 242, 246. It will be appreciated that when the fan 226 is activated, fluid is directed from the fan inlet, into the duct 236 and through the terminal ends of the arms 242, 246 to the respective outlet 224a, 224b and through the vents 122 on the lower face 120 of the battery housing 100.

The fan 226 can be activated as desired. For example, the charger electronics could be coupled with a sensor inside the battery pack 102 that would be activated through the electrical contacts. The sensor could sense a property of the cell pack 20 such as voltage of one or more cells 1, temperature within the cell pack 20, or other property. Based on the output of the sensor, the fan 226 could be activated to run. Alternatively, the fan 226 could be activated to continuously be activated while the charger is operating. The fan 226 could also be activated through the use of a manual switch provided on the charger housing 200.

In yet another alternative, a mechanical switch may be provided such that when a battery pack 102 is positioned within a slot 210 of the charger housing 200, the fan 226 can be activated. In this embodiment, when the battery pack 102 is removed from the slot 210, the fan 226 will be de-energized.

Other fan modulation process may also be used. For example, the fan 226 may be turned on for a predetermined period and turned off before a battery pack 102 is disposed on the charger 200. This period could occur when the charger 300 is either turned on, connected to an electrical outlet or when a button on the charger 200 is pushed. This would blow foreign particles, such as dust, that has settled on the charger 200 and or the slot 210. Accordingly, the particles or dust would not be blown into the battery pack 102 during charging. This result can also be achieved if the fan 226 is always on, on after the battery pack 102 has been removed, or if the fan 226 is periodically turned on and off when the battery pack 226 is not disposed in the charger 200.

In addition, rather than fan 226 being completely turned off, it may be expedient to just regulate the power sent to the fan 226 so that the fan 226 rotates at a lower speed. Accordingly, the fan 226 can rotate at a first speed before the battery pack 102 is disposed on the charger 200. When the battery pack 102 is disposed on the charger 200, the fan 226 can rotate at a second speed, which is higher than the first speed. When the battery pack 102 is removed, the fan 226 can be turned off completely or brought back to a lower speed. This would also help in maintaining the duct 230 free of dust.

It may be desirable to turn the fan 226 on at a high first speed for a predetermined period and then lower the speed before a battery pack 102 is disposed on the charger 200. This period could occur when the charger 200 is either turned on, connected to an electrical outlet or when a button on the charger 200 is pushed.

Furthermore, the charger 200 can control the speed of the fan 226 by using information from the temperature indicating device. For example, the charger 200 would receive information from the temperature indicating device. If the battery pack 102 is below a first desired temperature, the charger 200 would lower the speed or stop the fan 226. Similarly, the charger 200 can control the fan 226 to maintain the temperature of battery pack 102 near a predetermined temperature.

In addition, the charger 200 can control the fan 226 to obtain accurate information from the temperature indicating device. For example, if the temperature indicating device was exposed to the air or fluid flow, the temperature indicating device might indicate a cell temperature lower than the actual cell temperature. Such result can be minimized or avoided if the charger 200 periodically lowers the speed of or stops the fan 226 for a predetermined period of time. This would allow the temperature indicating device to indicate or show a more accurate cell temperature, which can then be read by the charger 200 and used in its temperature analysis. The charger 200 can then increase the speed of or start the fan 226 until the next time the charger 200 needs temperature information.

While the invention has been described in conjunction with specific embodiments it is to be understood that many alternatives, modifications, and variations will be apparent to those skilled in the art in light of the foregoing detailed description. It is therefore intended that the foregoing description be regarded as illustrative rather than limiting, and that it be understood that it is the following claims, including all equivalents, that are intended to define the spirit and scope of this invention.

What is claimed is:

1. A battery venting system comprising at least one cell that includes:
   a. a first end having a positive terminal;
   b. a second end having a negative terminal, the second end spaced from the first end to define a longitudinal extent of the cell;
   c. a peripheral side face disposed between the first end and the second end; and
   d. a sleeve surrounding the perimeter of the peripheral side face of the cell along at least a portion of the longitudinal extent of the cell, wherein the sleeve is provided with a plurality of apertures and is formed from an electrically insulating material.

2. The battery venting system of claim 1 wherein the sleeve is formed from a plastic mesh.

3. The battery venting system of claim 1 wherein the apertures have a shape selected from the group consisting of a circle, ellipse, parabolic, crescent, obround, disc, triangle, rectangular, polygonal, and mixtures thereof.

4. The battery venting system of claim 1 wherein the apertures have a shape with at least one long side and at least one short side such that the at least one long side is parallel to the longitudinal axis.

5. The battery venting system of claim 1 wherein the apertures have a shape with at least one long side and at least one short side such that the at least one long side is normal to the longitudinal axis.

6. A battery venting system comprising:
   a. a plurality of cells arranged side by side to define at least some adjacent cells with each cell comprising:
      i. a first end having a positive terminal,
      ii. a second end having a negative terminal, the second end spaced from the first end to define a longitudinal extent of the cell,
      iii. a peripheral side face disposed between the first end and the second end,
      iv. a sleeve surrounding the perimeter of the peripheral side face of the cell alone at least a portion of the longitudinal extent of the cell, wherein the sleeve is provided with a plurality of apertures and is formed from an electrically insulating material; and,
   b. a plurality of electrically conductive connecting members attached to one of the first end or one of the second end of at least some of the adjacent cells.

7. The battery venting system of claim 6 wherein the apertures have a shape selected from the group consisting of a circle, ellipse, parabolic, crescent, obround, disc, triangle, rectangular, polygonal, and mixtures thereof.

8. The battery venting system of claim 6 wherein the apertures have a shape with at least one long side and at least one short side such that the at least one long side is parallel to the longitudinal axis.

9. The battery venting system of claim 6 wherein the apertures have a shape with at least one long side and at least one short side such that the at least one long side is normal to the longitudinal axis.

10. A battery venting system comprising:
    a. a plurality of cells with at least one cell including a first end, a second end spaced from the first end to define a longitudinal extent of the cell, a peripheral side face disposed between the first end and the second end; and a sleeve formed from an electrically insulating material and surrounding the perimeter of the peripheral side face of the cell alone at least a portion of the longitudinal extent of the cell, wherein the sleeve is provided with a plurality of apertures;
    b. an upper carrier having a plurality of spaced apart ribs extending from a major surface to selectively position one of a plurality of cells;
    c. a lower carrier having a plurality of ribs extending from a major surface to selectively position a plurality of cells and to sandwich the plurality of cells between the upper carrier and the lower carrier such that the plurality of cells are aligned parallel to each other to define a gap between adjacent cells;
    d. a plurality of vent openings disposed on the upper carrier; and,
    e. a plurality of vent openings disposed on the lower carrier, wherein an elongated fluid flow path is defined by the vent openings and the gap.

11. The battery venting system of claim 10 wherein the cells are cylindrical.

12. The battery venting system of claim 11 wherein the cells have a first end, a second end, and a peripheral side face disposed between the first end and the second end and wherein the upper and lower carrier causes the ends to lie in a plane parallel to a plane of the upper and lower carrier.

13. The battery venting system of claim 11 further comprising at least one connecting member cut out provided on at least one of the upper carrier, the lower carrier, or both.

14. The battery venting system of claim 13 further comprising a plurality of electrically conductive connecting members attached to one of the first end or one of the second end of at least some of the adjacent cells.

15. The battery venting system of claim 10 wherein a portion of at least one opening on the upper carrier is aligned with a gap.

16. The battery venting system of claim 10 wherein a portion of at least one opening on the lower carrier is aligned with a gap.

17. The battery venting system of claim 10 wherein the cells are housed in a housing.

18. The battery venting system of claim 17 wherein the housing is removably coupled with a cordless power tool.

19. The battery venting system of claim 10 further comprising a plurality of spaced apart ribs extending from the major surface of the lower carrier to selectively position one of a plurality of cells.

20. The battery venting system of claim 10 wherein the vent openings near a center portion of the upper carrier have a size larger than the vent openings near a periphery of the upper carrier.

21. The battery venting system of claim 10 wherein the vent openings near a center portion of the lower carrier have a size larger than the vent openings near a periphery of the lower carrier.

* * * * *

UNITED STATES PATENT AND TRADEMARK OFFICE
CERTIFICATE OF CORRECTION

| | | |
|---|---|---|
| PATENT NO. | : 7,189,473 B2 | Page 1 of 1 |
| APPLICATION NO. | : 10/453836 | |
| DATED | : March 13, 2007 | |
| INVENTOR(S) | : Roger Q. Smith et al. | |

It is certified that error appears in the above-identified patent and that said Letters Patent is hereby corrected as shown below:

In the Claims

Column 11, in claim 6, line 43, after "side face of the cell" delete "alone" and substitute --along-- in its place.

Column 12, in claim 10, line 8, after "face of the cell" delete "alone" and substitute --along-- in its place.

Signed and Sealed this

Third Day of July, 2007

JON W. DUDAS
*Director of the United States Patent and Trademark Office*